June 24, 1947. W. D. HERSHBERGER 2,423,023

OBSTACLE DETECTION BY RADIO WAVE

Filed Sept. 30, 1938 2 Sheets-Sheet 1

Inventor
William D. Hershberger

By [signature]

Attorney

OBSTACLE DETECTION BY RADIO WAVE

Filed Sept. 30, 1938 2 Sheets-Sheet 2

William D. Hershberger
Inventor

By [signature]
Attorney

Patented June 24, 1947

2,423,023

UNITED STATES PATENT OFFICE 2,423,023

OBSTACLE DETECTION BY RADIO WAVES

William D. Hershberger, Collingswood, N. J., assignor to Radio Corporation of America, a corporation of Delaware Application September 30, 1938, Serial No. 232,631

4 Claims. (Cl. 250—1.56)

This invention relates to the detection of obstacles by means of radio waves and more particularly to a pulse-echo detection system in which the presence, distance, angular position of an object and its velocity with respect to an observer may be indicated.

In the pulse-echo system of obstacle detection, a pulse of radio frequency energy is radiated in the region in which obstacles are to be detected. Simultaneously with the radiation of the pulse a cathode ray is swept across a scale. Reception of a pulse, i. e., its reflection or echo, is indicated by a transverse movement of the cathode ray trace. The distance the ray has moved in the time interval between transmission and reception of the pulse is a measure of the distance from the transmitter to the reflecting object and back to the receiver.

When a pulse-echo system is used on an aircraft, for obstacle detection, it is difficult to concentrate the radiation field in a narrow region along the aircraft course because the space available for equipment is limited. The narrowest practical beams have a divergent angle which permits reception of echoes from objects on either side of the course. Thus the indicator does not distinguish reflections from obstacles directly on course and reflections from objects off course.

It is one of the objects of the invention to provide means for utilizing the Doppler effect to distinguish obstacles on the course of a moving vehicle from objects off the course. Another object is to provide means for utilizing the Doppler effect to determine the velocity of a moving vehicle by means of the pulse-echo system. A further object is to provide means for indicating by means of a pulse-echo system the velocity of a moving vehicle and distinguishing obstacles on the vehicle course from objects off the course. An additional object is to provide means for indicating the distance from a fixed observer to a moving object and its velocity.

The invention will be described by reference to the accompanying drawings in which:

Figure 1 is a schematic diagram of a pulse-echo system for determining distance;

Figure 1*a* is a graphic illustration of a pulse-echo distance indicator;

Figure 2 is a schematic diagram of a pulse-echo system for determining velocity or angular position of reflecting objects;

Figure 2*a* is a graphic illustration of a pulse-echo velocity or angle indicator;

Figure 1:
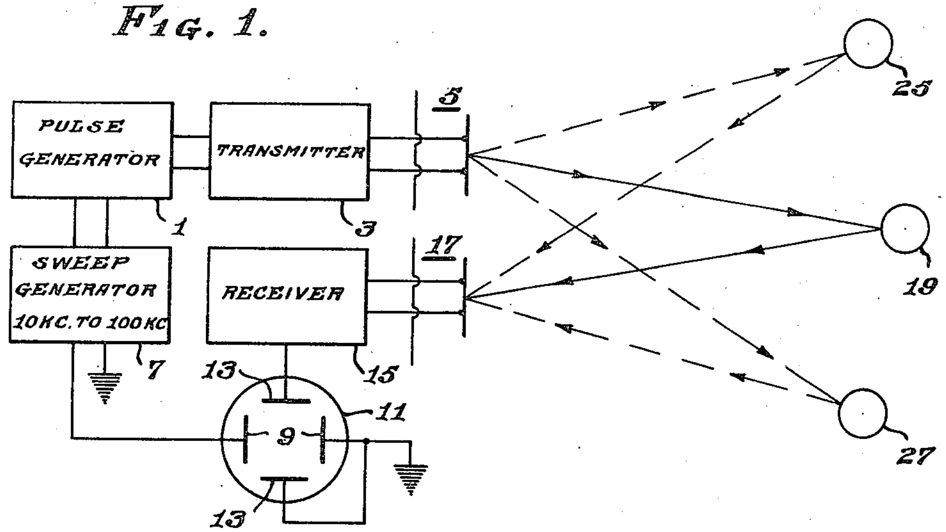

It is well known that when an observer approaches a source of waves he notes an apparent increase in their frequency and a decrease in frequency if he is going away from such source. This phenomenon is known as the Doppler effect. It is equally true that the observer may be stationary and, if the source is moving, the apparent frequency will change. Thus, the change in frequency may be used to indicate the relative velocity of the observer and the source. The component of motion parallel to the straight line joining observer and source is effective in causing a Doppler change in frequency and the component perpendicular to this line produces no such effect. As a result the change in frequency observed is proportional to the cosine of the angle between the straight line joining observer and source and the line defining the direction of travel at the instant considered.

The pulses of radio energy are a few tenths of a microsecond duration. These pulses are radiated at intervals which are long enough apart to permit the reflection or echo to be received from the most distant object of interest before the radiation of a succeeding pulse. The frequency of the energy may be of the order of five hundred megacycles per second. If such pulses are radiated from a moving aircraft, the echo pulses received on the craft will have a different frequency because of the Doppler effect.

In order that the reflected pulses of "apparently different frequency" may have a constant frequency to beat against, a local oscillator is incorporated in the receiver. The local oscillator is operated continuously at the same frequency as the transmitter and may, in fact, be a supplemental use of the oscillator used in the transmitter pulse generator. The reflected pulse energy will not be continuously received, but will be received at the pulsing frequency which is very much higher than the beat frequency due to the Doppler effect. By way of example, the pulsing frequency may be of the order of 20 kc. The pulsing frequency envelope will include the frequency which will beat against the local oscillator. The intervals between the pulses will not destroy the desired beat frequency.

The greatest increase in frequency will occur when the craft is flying directly at the reflecting object. The frequency will decrease when flying directly away from the object. Because of the relative high velocity of the radio waves and the low velocity of the craft and the comparative short range, the change in frequency will be practically zero for reflections from objects ninety degrees off course.

The apparent change in the frequency of the transmitted wave due to the Doppler effect may be expressed by the formula:

$$f \text{ equals } \frac{10^9 s \cos \theta}{c}$$

where $f$ equals change in frequency in cycles per second, $s$ equals velocity of craft, $c$ equals velocity of light, $\theta$ equals angle between course and the path of the echo and a transmission frequency of 500 megacycles per second is assumed. The following table indicates the magnitude of the change in frequency, assuming a 500 megacycle pulse frequency, and an angle of 20° between the course and the reflecting object.

| $s$ in miles per hour | $f$ in cycles per second |
|---|---|
| 30 | 41.6 |
| 90 | 125 |
| 180 | 250 |
| 360 | 500 |

Since the radiation will be concentrated in a cone of finite angle, say 15°, the reflected energy will include a plurality of changes in frequency due to the plurality of different angles within the beam. This difficulty is solved by means of a frequency analyser hereinafter described.

Figure 1A:
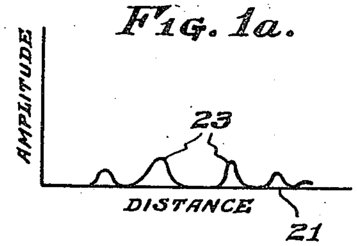

Referring to Figs. 1 and 1*a*, a pulse generator 1 is connected to a transmitter 3. The transmitter output is applied to an antenna array 5. The pulse generator is also connected to a sweep generator 7, which is connected to the horizontal deflection elements 9 of a cathode ray tube 11. The vertical deflection elements 13 are connected to the output of a receiver 15. The receiver may be coupled to a separate antenna array 17 or the transmitting and receiving arrays may be combined as disclosed in copending application Serial No. 184,354, filed January 11, 1938, by Irving Wolff and W. D. Hershberger for "Signaling system."

Pulses radiated from the transmitting antenna 5 are reflected by an obstacle 19 and received by the receiving antenna 17. The received energy is applied to the receiver 15, and hence to the cathode ray tube.

If there were no reflections, the cathode ray would sweep the horizontally arranged distance scale 21 without vertical deviations. Reflected energy impinging on the receiver gives rise to an output which applied to the vertical deflection elements 13 deflects the trace transversely as indicated by the peaks 23 to thereby indicate the distance from the transmitter to the reflecting object. If there are objects 25, 27 to the right or left—or above or below—the course and within the radiation field, these objects will likewise cause reflections or echoes. Since the indication is that of distance, reflections from on course and off course will not be distinguishable.

Figure 2A:
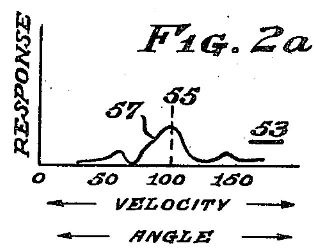
Figure 2:
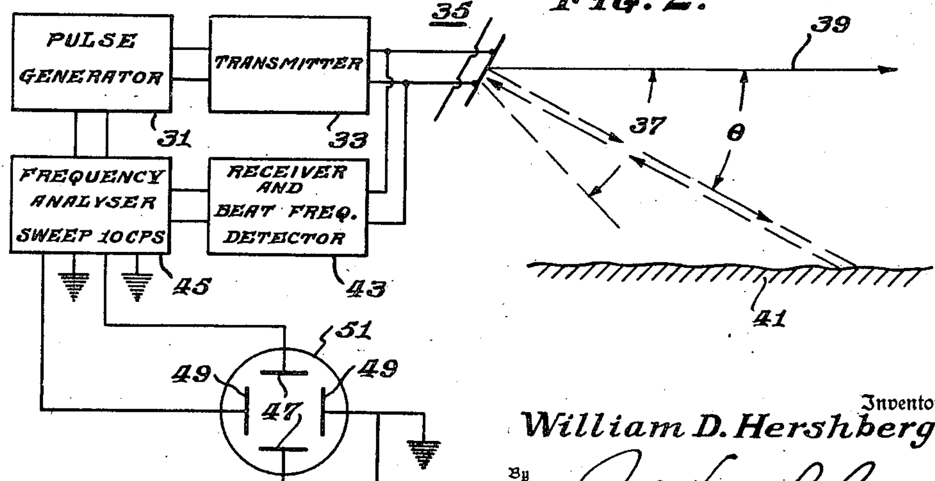

Referring to Figs. 2 and 2*a*, a pulse generator 31 is connected to a transmitter 33. The output of the transmitter is impressed on an antenna array 35 from which is radiated pulses in a cone shape region 37. The axis of the cone forms an angle $\theta$ with the course 39 and the axis is directed toward the earth 41. Reflected pulses are received by the array 35, or a separate antenna if desired, and applied to a receiver 43. The output of the receiver is applied to a frequency analyser 45. The output from the frequency analyser includes the demodulated received pulses and a sweep voltage. These outputs are impressed respectively on the vertical 47 and horizontal 49 electrodes of a cathode ray tube 51.

The operation of the pulse-echo system of Fig. 2 is as follows:

The distribution of power in the conical region 37 at 6° off the axis may fall off about 50% from the power at the axis and at 20° to 10% for a typical antenna. This means that most of the energy will be directed along the axis and therefore most of the power of the received signal will come from reflections along the cone axis. Furthermore, if the distribution of power in the range of frequency due to the Doppler effect is analysed, it will be found that a "center" or reference point coinciding with the axis may be determined.

The frequency analyser 45 makes it possible to continuously resolve the power-frequency distribution of the received pulses. The sweep frequency of 10 cycles per second moves the cathode ray along a horizontal axis in synchronism with the changing frequency response of the analyser. The response of the receiver is applied to the analyser and hence to the cathode ray tube to vertically deflect the cathode ray. The distribution is shown by the line 53 of Fig. 2*a*. The "center" is represented by the line 55 which is drawn through the major response or peak 57.

Figure 5:
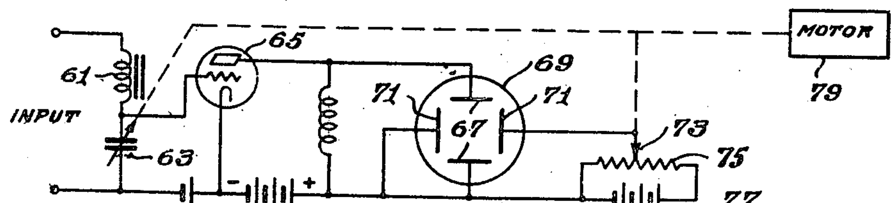
Figure 5 is a diagram of one form of frequency analyser used in the invention.

One form of frequency analyser circuit is shown in Fig. 5. An inductor 61 and a variable capacitor 63 are connected in series. The variable capacitor is connected to the input of an amplifier 65. The amplifier output is connected to the vertical deflection elements 67 of a cathode ray tube 69. The horizontal deflection elements 71 are connected to the adjustable contacts 73 of a potentiometer 75, which is connected to a battery 77. The capacitor and the horizontal deflection voltage are synchronously varied throughout their range by a common connection to an actuating motor 79. The input of the frequency analyser is connected to the output of the receiver. The output includes demodulating means in which the beat note, established by the difference in frequency between transmitted and received pulses, is derived.

It has been explained above that the change in frequency due to the Doppler effect is proportional to the velocity. Therefore, it follows that the cathode ray tube indicator 51 may be calibrated to indicate velocity. If the "center" 55 moves to the right, the velocity has increased, and vice versa. In short, the position of the "center" gives the ground velocity of the plane. In like manner, if the frequency analysis shows a peak outside of the "center," an object is indicated which is angularly disposed with respect to the axis of the cone. If the peak outside of "center" represents a frequency higher than that of "center," the obstacle is off the course more than $\theta$. If this peak represents a frequency less than that of "center," the obstacle is off the course more than the angle $\theta$. Furthermore, if the peak moves toward the "center" or reference line, it indicates that the object is coming nearer the axis of the beam of radiation. Movements of such peak away from center and toward zero indicate that the craft is passing such object. If the velocity is determined by noting the position of "center" on the frequency side, then the angle may be determined in degrees although the sign (plus or minus) will be unknown.

Figure 3:
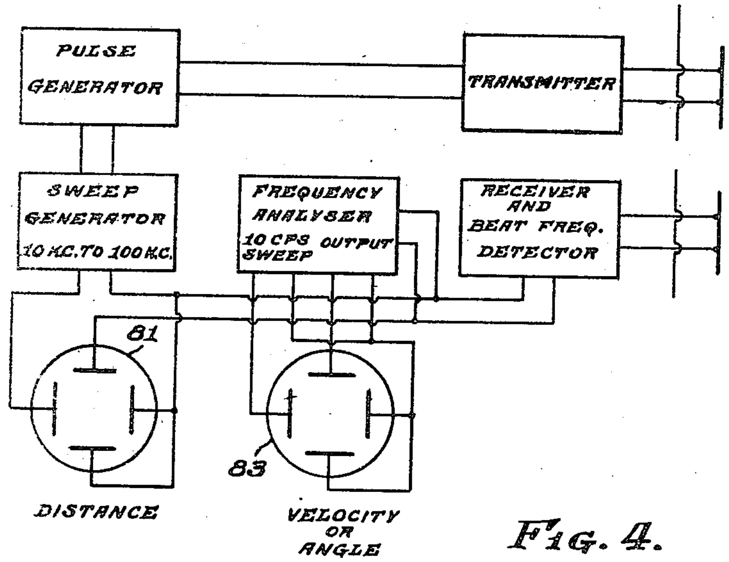
Figure 3 is a schematic diagram of a pulse-echo system for separately indicating distance and angle and velocity of reflecting objects.

It is not necessary to employ two complete systems of the character of the arrangements of Figs. 1 and 2. These systems may be combined in accordance with the schematic circuit diagram of Fig. 3. In this arrangement, a pair of cathode ray tubes 81, 83 are used: One indicates the distance; the second indicates velocity and angle as previously described. It is not necessary to describe in detail the circuit; it is substantially a repetition of the preceding circuits.

Figure 4:
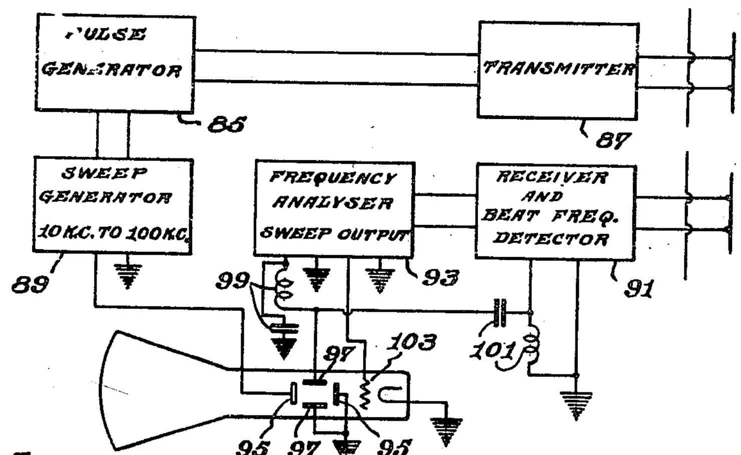
Figure 4 is a schematic diagram of a pulse-echo system with a single indicator for showing distance and angular disposition of reflecting objects.

In a preferred embodiment of the invention, a single indicator is used. The schematic diagram for the single indicator is shown in Fig. 4. In this arrangement, the pulse generator 85, transmitter 87, sweep generator 89, receiver 91, and frequency analyser 93 are connected as previously described. A single cathode ray tube is connected as follows: The horizontal deflection electrodes 95 are connected to the sweep generator 89; the vertical deflection electrodes 97 are connected to the frequency analyser sweep circuit through a filter 99 and to the receiver 91 output circuit through a filter 101. The output from the frequency analyser is applied to the control electrode 103 of the cathode ray tube.

The operation of the single indicator system is not unlike the systems with two indicators as far as the transmission, reception, demodulation, sweep and frequency analyser circuits are concerned. The difference is found in the form in which the information is conveyed. In this system, vertical deflections correspond to angular position, while horizontal deflections correspond to distance. In brief, the information is established by rectangular coordinates. The grid or control electrode 103 is normally biased so that only substantial reflections, represented by power from the frequency analyser output circuit, permit the cathode ray to impinge on the cathode ray tube screen. Thus off course reflections, unless they represent large amounts of power, are not observed. Such reflections as are indicated show both distance and angular disposition.

Thus the invention has been described as a pulse-echo system in which the change in frequency due to motion of the transmitter and receiver relative to the reflecting object, is used to indicate velocity and angular position. The change in frequency is observed as a beat note between the frequency of the outgoing and incoming pulses. One form of beat frequency analyser, involving moving parts, is shown. It should be understood that any suitable frequency analyser may be substituted; for example, electronic frequency analysers making use of vacuum tubes may be used.

While the invention has been described as applied to aircraft, it should be understood that the system may be employed wherever the Doppler effect may be observed. The apparatus may be stationary and the movement of an object indicated.

I claim:

1. A pulse-echo system for observing velocity and distance of objects along a course including means for directively radiating a pulse of radio-carrier frequency energy, means for receiving said pulse after reflection from said object, means for obtaining demodulation currents of a frequency equal to the difference in the carrier frequency of said radiated pulse and the carrier frequency of said received reflected pulse due to Doppler effect, means for analysing the energy distribution of said demodulation currents as a function of their frequency, means for indicating the time between said transmission and reception, and means for indicating the relative direction of said object as a function of said demodulation currents.

2. A system for detecting objects along a course and indicating velocity including means for generating pulses of carrier radio frequency energy, means for directively radiating said pulses, means for receiving said pulses after reflection from said objects, means for obtaining currents of a frequency equal to the carrier frequency difference betwen a transmitted and received pulse, means for indicating the interval between the transmission and reception of said pulse, means for analysing the energy distribution as a function of said difference frequency, whereby the relative velocity and distance of an object may be determined, and means for indicating the relative direction of said objects as functions of said difference frequency.

3. The method of indicating the angular relation with respect to a course and distance of an object with respect to a point which includes directively radiating pulses of carrier radio frequency energy from said point, receiving said pulses after reflection from said object, obtaining currents of a frequency determined by the Doppler effect along said course upon the carrier frequency of the radiated pulses and the carrier frequency of the received reflected pulses, determining the time required for the transmission of one of said pulses from said point to said object and back to said point, and indicating said angular relation and said distance as functions of said last-mentioned frequency and said time respectively.

4. The method of indicating the angular relation of an object with respect to a course, and distance of the object with respect to a point on the course by means of rectangular coordinates on the screen of a cathode ray tube which includes transmitting a pulse of carrier radio frequency energy toward said object, simultaneously deflecting said cathode ray along the first of said coordinates, receiving said pulse after reflection from said object, deflecting said cathode ray along the second of said coordinates as a function of said reception, detecting the difference in carrier frequency of said transmitted and received reflected pulse, deflecting said ray along said second coordinate as a function of a range of frequencies including said difference in carrier frequency, and controlling said cathode ray intensity as a function of the amplitude of said difference in carrier frequency, whereby the first of said coordinates indicates distance and the second of said coordinates indicates angular relation.

WILLIAM D. HERSHBERGER.

REFERENCES CITED

The following references are of record in the file of this patent:

UNITED STATES PATENTS

| Number | Name | Date |
|---|---|---|
| 1,924,156 | Hart | Aug. 29, 1933 |
| 1,982,271 | Turner | Nov. 27, 1934 |
| 2,055,883 | Terry | Sept. 29, 1936 |
| 1,945,952 | Nicholson | Feb. 6, 1934 |
| 2,116,717 | Scharlau | May 10, 1938 |
| 2,134,716 | Gunn | Nov. 1, 1938 |
| 2,193,361 | Rice | Mar. 12, 1940 |